Oct. 11, 1932.   W. S. SHAW   1,882,450
LINTING MACHINE
Filed Sept. 21, 1929   4 Sheets-Sheet 4
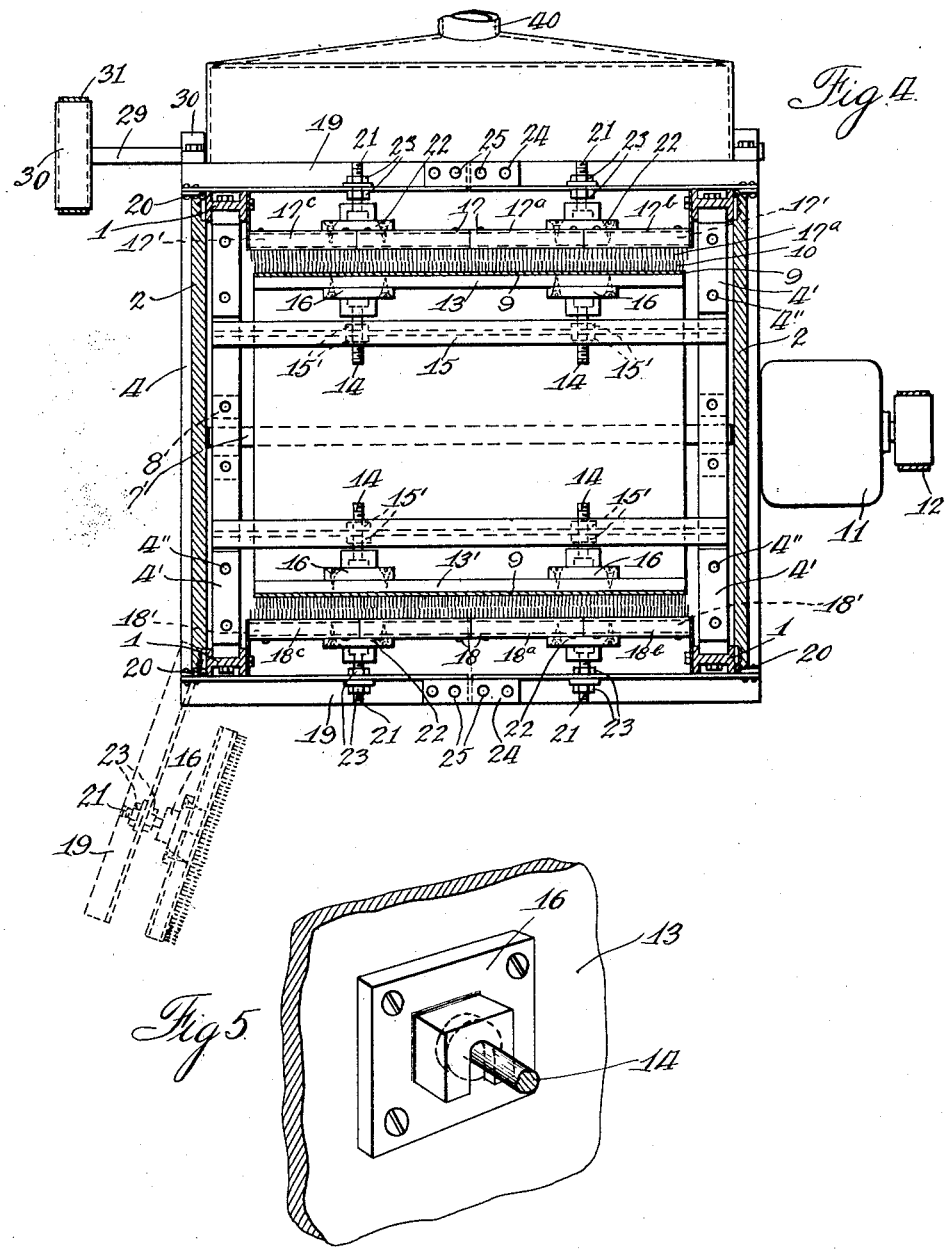

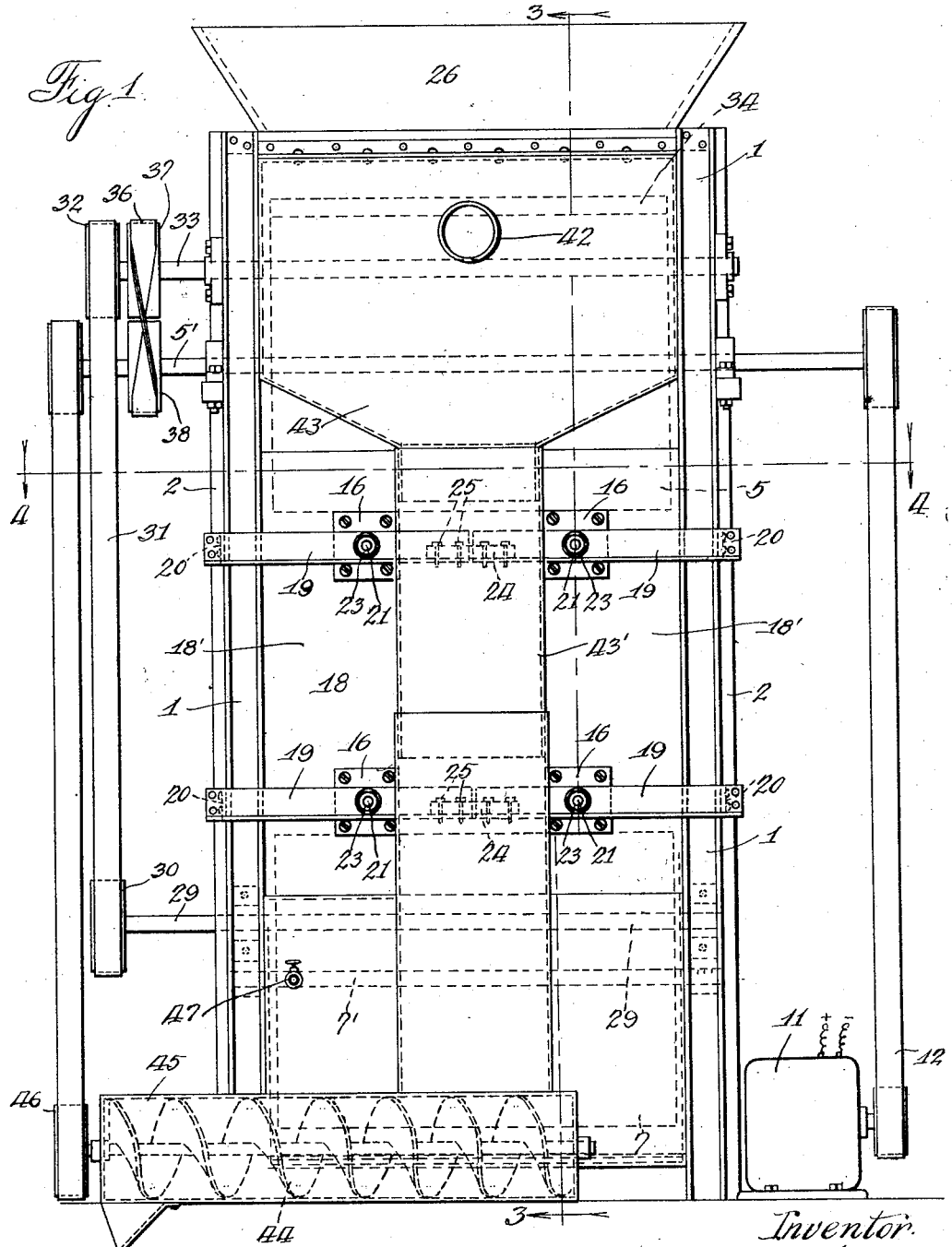

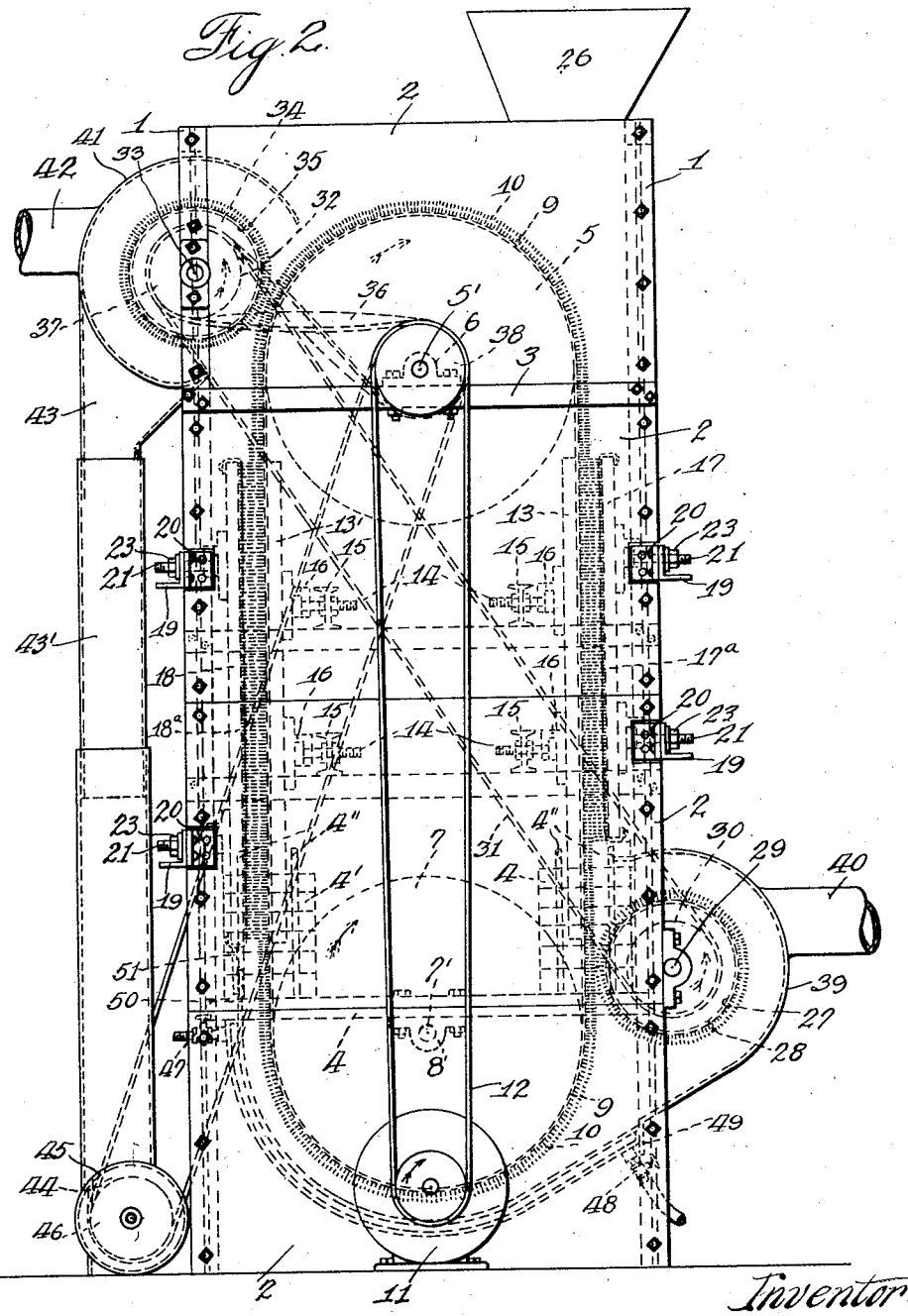

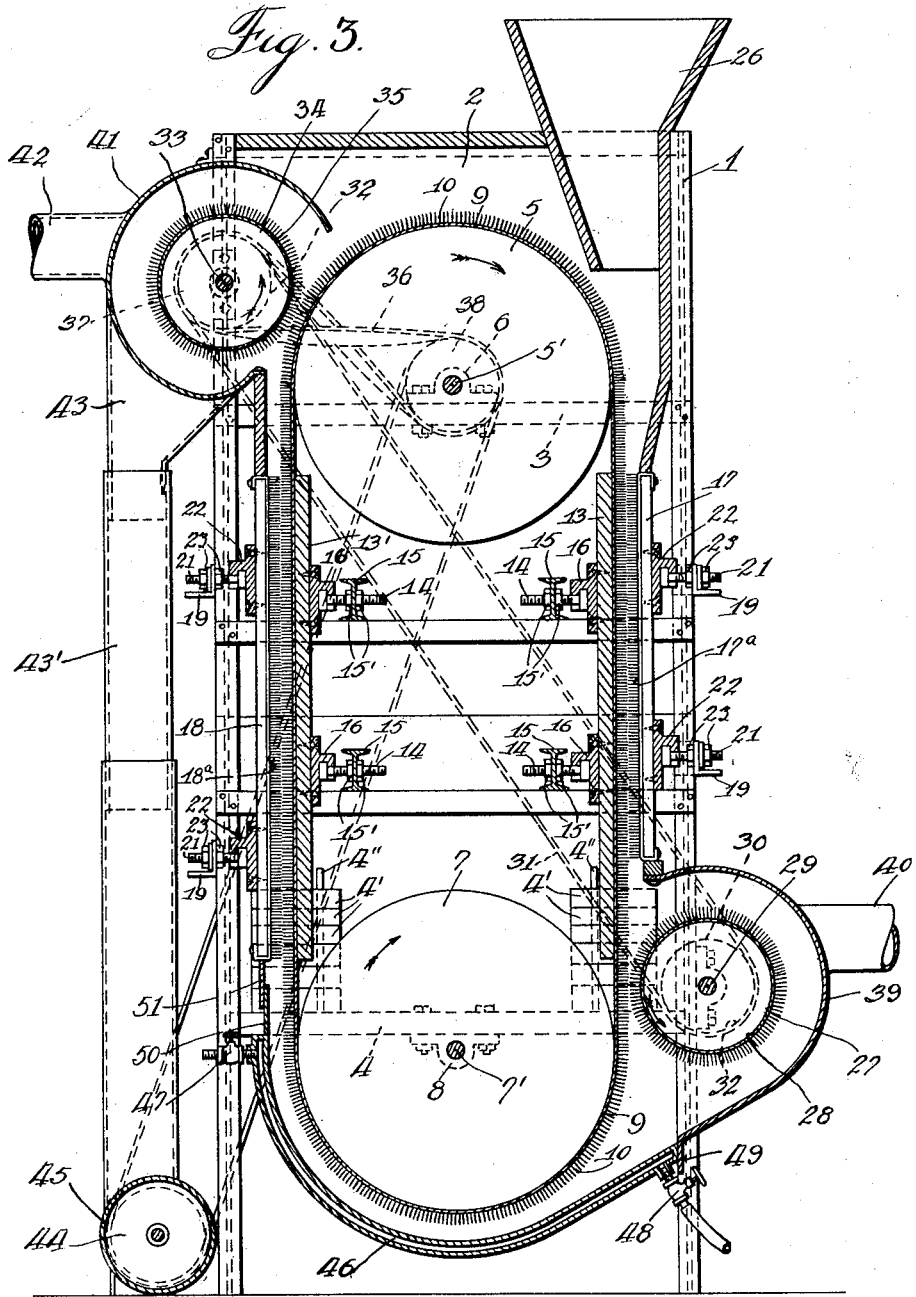

Patented Oct. 11, 1932

1,882,450

UNITED STATES PATENT OFFICE

WILLIAM S. SHAW, OF BOYNE CITY, MICHIGAN

LINTING MACHINE

Application filed September 21, 1929. Serial No. 394,148.

My invention relates to a new and useful machine for ginning or delinting cotton seed, but which is also capable of use in ginning cotton.

One of the objects of this invention is to provide a new and useful cotton seed linting machine to be used in ginning plants where the cotton seed must be delinted and cleaned in preparation for the oil-extracting process or for planting.

Another object of my invention is to provide a cotton seed linting machine which will produce separately, in the same operation, different grades of cotton lint, and which will, at the same time, prepare the cotton seed for subsequent operations.

Further objects of my invention are to provide a cotton seed linting machine which will be compact and substantial on the one hand, but which will, because of its construction, have a substantially larger output than machines of the same general size now being used; to provide a machine which, because its revolving drums are placed one directly above the other, permits the linting belt which travels about the drums always to hang true and in balance, and causes it to exert a uniform tension at all points where it is operative in the linting process; to provide a machine so constructed as to permit of easy and ready access for purposes of adjusting, repairing, or inspecting; to provide a machine which may readily be adjusted for use with various sizes and qualities of cotton seed.

A further object of my invention is to provide a linting machine combining linting elements which effectively comb the lint and fuzz from the seed, and separating elements which separate the lint and fuzz from the seed.

With these and other objects in view, my invention consists, mainly, in providing two drums or pulleys, of suitable dimensions, placed apart, one above the other, around which is placed an endless belt known in the art as carder cloth, equipped with spaced carder points. The lower drum is mounted to float, the same being arranged upon a shaft which is weighted and slidable in a vertical direction; thus a means is provided for causing the belt to exert a uniform tension throughout. The whole is supported on a steel frame upon opposite sides of which, breasts are positioned parallel to the belt. These breasts are so constructed as to be adjustable with relation to the belt, and are provided with carder cloth having closely spaced carder points. The carder cloth on these breasts is put on in sections so that in the event that repairs or replacement to a particular part become necessary, only one section need be removed or replaced, thus accomplishing a saving in material and time. At the top of one side of the machine is a hopper from which the cotton seed is fed into the machine. The belt revolving in a downward direction at the point where the cotton seed is introduced, carries it down between the carder points on the one breast and thus effects a combing of the seed and a stripping of a substantial part of the lint therefrom by the time it has reached the lower portion of the machine where a cleaner roll, also provided with carder cloth and carder points, removes the cut lint which is carried from the machine by means of air pressure. The seed then falls to the bottom of the machine where it is once more seized upon by the carder points on the belt revolving about the underside of the lower drum and thus brought up and torn through the carder points on the breast situated on the side opposite to that before mentioned. The last remnants of lint or fuzz are torn from the seed during this operation, as the breast is adjustable so that the space between the breast and belt may be made smaller or larger according to the amount of lint remaining on the seed after the first operation. At the top of the machine, adjacent to the top drum, is another cleaner roll which removes the seed and lint from the carder belt, the lint being carried from the machine by air pressure, and the seed dropping by gravity through a vertical passageway from the bottom of which it is carried from the machine by means of a spiral or other suitable conveying means. Attached to the frame of the lower drum is a water jacket through which cold water is circulated for the purpose of removing heat generated by friction between the belt and seed during the first combing operation and during the process of picking up the seed below the lower drum for the second operation.

Further objects and advantages will become apparent from the following description and claims, taken in connection with the accompanying drawings in which:

Figure 1 is a rear elevational view of the machine;

Fig. 2 is a side elevational view thereof;

Fig. 3 is a vertical section taken on line 3—3 of Fig. 1;

Fig. 4 is a horizontal section taken on line 4—4 of Fig. 1; and

Fig. 5 is a detail perspective view of the adjustable support for the breast sections.

Referring now more particularly to the drawings, the preferred form of construction comprises a substantially rectangular housing or casing formed of four vertical corner posts or frame members 1 to which are secured suitable housing sheets or plates 2 which may be readily removed to permit of access being gained to the interior of the machine.

At opposite sides of said housing, above and below, are horizontal frame members 3 and 4. Arranged at the upper end of the housing is a drum 5 disposed on a horizontal axis. Said drum is fixed to a shaft 5′ which is mounted to rotate in bearings 6 secured to the frame members 3. Disposed below and arranged parallel with the drum 5 is another floating drum 7, of the same dimensions as said drum 5, which is fixed to shaft 7′ mounted to rotate in bearings 8 which are secured to the frame members 4. These frame members are slidable vertically in I-beams 1, and attached to said frame members are weights 4′.

Mounted on, and arranged to travel around, the two drums 5 and 7 is an endless carder belt 9 of substantially the same width as said drums, said belt being equipped with a number of closely spaced carder points 10, as will be readily understood by those skilled in the art. The weights 4′ tend to draw the drum 5 downward against belt 9 with the result that the belt is always maintained at a uniform tension. The tension may be changed as desired by simply adding or removing weights which are loosely mounted on vertically disposed pins 4″ fixed to the frame members 4.

Said drums are driven by a motor 11 operatively connected with the shaft 5′ through the medium of belt 12.

Arranged adjacent the inner surface of the carder belt 9 at the front and rearward sides of the machine are supports 13 and 13′, as best seen in Fig. 3. These supports serve to hold or brace the downwardly and upwardly moving portions of the carder belt in the operation of the machine causing said portions of the belt to move in a straight line and to withstand any pressure to which the belt may be subjected in the passage through the machine of the seeds being treated.

In order to render said supports adjustable so as to compensate for any wear thereon produced by the passage of the carder belt over the surface thereof, the supports are adjustably mounted. This adjustable mounting of each support comprises bolts 14 which register with the upper and lower end portions of the support. Said bolts pass through the frame members 15, the heads of said bolts engaging in slotted plate 16 secured to the inner side of each support as best seen in Fig. 3. Nuts 15′, threaded upon each of the bolts 14, serve as a means of adjusting the position thereof and of locking the same in positions of adjustment.

With this arrangement, it will be seen that supports 13 and 13′ may be readily moved toward and from the belt 9 and locked in any position of adjustment in order to compensate for any wear.

At the outer side of carder belt 9, directly opposite supports 13 and 13′ and registering with the downwardly and the upwardly moving portions respectively of said belt, are carder breasts 17 and 18. The inner sides of said breasts are provided with coverings 17a and 18a respectively of carder cloth. Said carder cloth members are equipped with carder points adapted, in the operation of the machine, to cooperate with the points of the carder belt 9 in the removal of lint from the seeds treated.

It is preferable to put the carder cloth on in sections such as shown at 17b, 17c, 18b and 18c in order to allow only small parts to be removed for replacement or repair.

In order to render said breasts adjustable and the cloth covering the inner sides thereof readily accessible, each of the carder breasts 17 and 18 is formed of two sections, the sections of breast 17 being numbered 17′—17′ and those of section 18 are numbered 18′—18′, as best seen in Figs. 1 and 4. Each of said carder breast sections is carried by two supporting arms 19, the outer ends of which are hinged at 20 to the corner posts 1, as best seen in Fig. 4. Through the supporting arms 19, extend bolts 21, the inner headed ends of which engage with slotted plates 22 secured to the adjacent carder breast. It will be seen that each carder breast section is thus supported by two bolts 21 which, in turn, engage with two of the hinged supporting arms 19, permitting each carder breast section to swing outwardly, the arrangement being such also that each carder breast may be adjusted toward or from the supporting arms 19 and toward or from the carder belt 9 through adjustment of nuts 23 threaded upon the bolts 21 and which engage against the opposite sides of the bars 19. In this way the carder breasts may be adjusted to position the points of the carder cloth carried thereby closer to or farther from the carder points of belt 9 in order to adapt the machine to accommodate seeds of different sizes and to compensate for wear on the carder points during operation.

Moreover, the carder points at the front side of the machine or closest to the inlet may thereby be adjusted further apart than those at the opposite or rear side of the machine, since in the linting operation, the first combing will be made as the seeds pass downwardly when most of the lint will be removed, whereas, a finer and final combing will be made when the seeds move upwardly at the opposite side of the machine. The mounting of the carder breasts is such also that the same may be tilted longitudinally of the belt 9 or so that one end will be further from said belt than the other. By reason of such adjustment the breast 17 may be adjusted to an inclined position with its upper end spaced considerably from the carder belt 9 and with its lower end gradually approaching said belt, in order to accommodate relatively large balls of cotton which may be fed to the machine when the latter is used for ginning cotton.

The bars 19 carrying the carder breast sections at each side of the machine meet at the center of the machine when the breasts are in operative position and may be locked in operative or aligned relation by means of bars 24 carrying pins 25 adapted to loosely engage with corresponding openings formed in said bars 19, as best seen in Fig. 1. With this arrangement it will be seen that the bars 19 may be readily unlocked so as to allow the same to be swung outwardly and to carry the carder breasts therewith in order to allow of ready access to the carder points.

Arranged in the upper part of the machine directly above the downwardly moving side of the carder belt 9 is an inlet hopper 26 into which the seeds to be acted upon are dumped, in the operation of the machine. Arranged adjacent to the lower end of the downwardly moving side of the belt 9, immediately below the carder breast 17, is a cleaner roll 27 equipped with a covering of carder cloth 28, having carder points disposed to engage with, and remove the lint from, the points of the carder belt as the same pass said cleaner roll.

The cleaner roll 27 is fixed to shaft 29 mounted in suitable bearings and equipped with a pulley 30 around which travels an endless belt 31 which also travels around a pulley 32 fixed to a shaft 33 suitably mounted at the upper end of the machine. On the shaft 33 is fixed a cleaner roll 34 covered with a carder cloth 35, and disposed to cooperate with the carder points at the upper terminal of the upwardly moving side of carder belt 9. The cleaner roll 34 performs a function similar to the cleaner roll 27, the latter serving to clean the carder belt at the conclusion of the first combing during operation of the machine, whereas, the cleaner roll 34 serves to clean the belt at the conclusion of the second combing.

Said cleaner roll 34 is driven through the medium of a twisted belt 36 traveling around a pulley 37 on the shaft 33 and a pulley 38 on the shaft 5'. It will be recalled that shaft 5' is power driven through the medium of belt 12 from the motor 11. It will be seen also that the lower cleaner roll 27 is driven from the same source inasmuch as the shaft 29 thereof is operatively connected by means of the belt 31 with the shaft 33.

The lower cleaner roll 27 is encased in a housing 39 from which leads a suction pipe 40 which may be suitably connected to any suction creating means. In operation. the lint removed by the cleaner roll 27 will be drawn upwardly by the suction of pipe 40 and delivered through said pipe to any suitable place of storage or for further treatment of the lint. The seeds are of such weight that the same will not be affected by this suction, but, instead, travel downwardly by gravity and are again picked up by the points of the carder belt and carried upwardly past the carder breast 18, the cotton removed by the upwardly moving side of the carder belt being collected by the cleaner roll 34. This roll is similarly encased in a housing 41 from the upper end of which extends a suction pipe 42 which serves to draw off the lint which has been separated from the seeds during the final combing and collected by roll 34.

At the lower side of housing 41 is a trough 43 into which the delinted seeds drop by gravity, passing thence into a pipe 43' which conveys the same by gravity to the screw conveyor 44 arranged in a housing 45, whereby the seeds are conveyed from the machine for further operation, such for instance, as pressing the same to remove the oil. The pipe 43' will be readily removable so as to be permitted to be removed from its place to avoid any interference when the carder breast sections 18'—18' are swung outwardly.

The machine is designed to operate at a high speed and because of the friction developed in the combing of the lint from the seeds during the first combing operation and because also of the frictional contact of the belt and the carder points with the cotton seed and lint, considerable heat is developed. In order to overcome and dispel any heat developed, a cooling chamber 46 is formed in the housing surrounding the lower half of the periphery of drum 7, as best seen in Fig 3. This chamber is connected to the frame members 4 and moves up or down with the drum. The cleaner roll housing 39 is provided with an extension 49 which is adjacent to and in contact with chamber 46. This extension allows chamber 46 to move up or down in contact with it, and prevents any leakage in the machine. Likewise, a similar arrangement is provided at the opposite side of the chamber by means of extension 50, on that side of the chamber placed adjacent to and in contact with sectional plate 51 attached to adjacent corner posts or frame members 1. During operation, water is circulated through chamber 46 through the medium of inlet and outlet ports which are connected to supply and drain pipes 47 and 48 respectively. With this arrangement it will be seen that effective cooling is provided at the lower end of the machine and any injury due to overheating is avoided.

From the foregoing it will be observed that in the operation of the machine the cotton seeds to be treated will be deposited into hopper 26 at the front upper end of the machine. From this point the seeds travel downwardly by gravity to a position between the downwardly moving side of the carder belt 9 and the carder points of the breast 17. As the seeds travel downwardly the lint is combed therefrom through the cooperative action of the moving carder points of the belt and the stationary carder points of said breast.

The first combing, as it is known in this art, is accomplished when the seeds and lint reach the housing 39 of cleaner roll 27 at which point said roll functions to separate the combed lint from the seeds, the cotton or lint being withdrawn through the suction pipe 40, the seeds dropping by gravity into the water cooled section of the lower part of the machine. At this point the carder points of the belt 9, as the same travel around the lower drum 7, pick up the seeds again and carry the same upwardly into contact with the carder points of the breast 18. It is at this point that what is known as the second combing of the machine commences, the same being concluded as the seeds and lint enter the housing 41 of the upper cleaner roll 34.

As the seeds and lint enter the housing of the upper cleaner roll, said roll serves to separate the same, the cotton being withdrawn through the pipe 42, the delinted seed dropping by gravity through trough 43, and pipe 43' to the conveyor 44 below whence the same is conveyed to any point of disposal or for further treatment, as before described.

From the construction as described, it will be seen that the carder breasts at the opposite side of the machine will be entirely separate and distinct from each other, thus making it possible to use different kinds of points on the two breasts or during the first and second combings or in connection with seeds of various grades and sizes.

And it will be apparent, further, that the machine may be used either as a ginning machine or as a cotton seed linter, or as a combination of the two; for the breasts may be adjusted apart from the belt to accommodate balls of cotton for ginning the same, or may be more closely adjusted for linting cotton seed, or the breast 17 may be adjusted, as above described, to perform the ginning operation, while the breast 18 may be adjusted for combing the lint from the cotton seed separated out of the cotton during the first operation.

From the foregoing it will appear that among the advantages derived from this type of linter are the following:

The fact that the machine is constructed so that the drums are placed one above the other, results in efficient operation of the belts which are used to drive the various parts of the machine, since being placed vertically, they hang true and are in balance; the carder belt is maintained at a uniform tension throughout; the machine is so constructed that it may readily be inspected, both inside and out; the machine is, because of its construction, readily adjusted both inside and out; because of the sectional construction of the breasts and having the same hinged, in door fashion, permits of quick and easy inspection of the breasts and the carder belt, providing the machine with a water jacket midway of the process, prevents excess heating of the belt and of the material being operated upon in the machine; as the linting process is divided into two distinct operations within the machine it is possible to separate the two grades of cotton or lint which are obtained in the respective operations, instead of accumulating all of the lint in one batch, as is the usual method; by having the two separate operations in the machine it is possible to use the same suitable type of breast for each separate operation and at the same time each breast may be adjusted independently of the other so that the most efficient results may be obtained therefrom; and the machine may be used for ginning cotton, for linting cotton seed, or for performing a combination of the two operations at once.

While I have shown and described a preferred embodiment of my invention, it will be understood that the details of construction are capable of wide modification and variation while still the fundamental principles thereof. Hence, I reserve all such modifications, variations and mechanical equivalents as fall within the scope and purview of the appended claims.

I claim:

1. In a machine of the character described, the combination of a vertically disposed endless carder belt, means for driving said belt and a plurality of carder breasts fixed against movement in a direction longitudinally of the belt arranged in cooperative relation to said belt.

2. In a machine of the character described, the combination of a carder belt, means for driving said belt, a plurality of carder breasts fixed against movement in a direction longitudinally of the belt arranged in cooperative relation to said belt and a plurality of means for cleaning said carder belt.

3. In a machine of the character described, the combination of a vertically disposed endless carder belt, means for driving said belt, carder breasts situated midway of the upward and downward paths, respectively, of said belt and co-acting therewith to comb the lint from cotton seed, and cleaning rolls, situated at the bottom of the downward path of said belt and at the top of the upward path thereof, means for removing the lint from the machine and means for removing the delinted cotton seed from the machine.

4. In a machine of the character described, the combination of a vertically disposed endless carder belt, means for driving said carder belt, a hopper for feeding cotton seed into the machine, a plurality of adjustable, sectional hinged carder breasts situated midway of the upward and downward paths, respectively, of said belt, and co-acting therewith to comb the lint from cotton seed, and cleaning rolls situated at the bottom of the downward path of said belt and at the top of the upward path thereof, means for removing the lint from the machine and means for removing delinted cotton seed from the machine.

5. A machine of the character described, comprising a vertically disposed endless carder belt, means for driving said belt, consisting of revolving drums or pulleys spaced apart, a hopper for feeding cotton seed into said machine, a plurality of adjustable, sectioned hinged carder breasts situated midway of the upward and downward paths, respectively, of said belt and co-acting therewith to comb the lint from cotton seed, and cleaning rolls situated at the bottom of the downward path of said belt and at the top of the upward path thereof, means for removing the lint from the machine and means for removing delinted cotton seed therefrom.

6. In a machine of the character described, the combination of a vertically disposed endless carded belt, means for driving said belt, carder breasts arranged in cooperative relation to said belt, hingedly mounted carrier means for said breasts and means for adjustably mounting said breasts on said carrier means.

7. In a machine of the character described, the combination of a vertically disposed endless carder belt, means for driving said belt, carder breasts arranged in cooperative relation to said belt, hingedly mounted carrier means for said breasts, means for mounting said breasts on said carrier means to permit of adjustment of said breasts in a direction perpendicular to the plane of said carrier means.

8. In a machine of the character described, the combination of a vertically disposed endless carder belt, means for driving said belt, a plurality of carder breasts arranged in cooperative relation with said belt, hingedly mounted carrier means for said breasts and means for mounting said breasts on said carrier means to permit of adjustment of said breasts in a direction perpendicular to the plane of said carrier means.

9. In a machine of the character described, the combination of a vertically disposed endless carder belt, means for driving said belt, carder breasts arranged in cooperative relation with said belt, hingedly mounted carrier means for said breasts, means for mounting said breasts on said carrier means to permit of adjustment of said breasts toward and from said belt.

10. A machine of the character described, comprising a vertically disposed endless carder belt, means for driving said belt, carder breasts fixed against movement in a direction longitudinally of the belt arranged in operative relation to said belt, and means for dispelling heat created during operation.

11. A machine of the character described, comprising a vertically disposed endless carder belt, means for driving said belt consisting of vertically spaced drums, the upper rigidly mounted and the lower slidably secured and weighted, and carder breasts fixed against movement in a direction longitudinally of the belt arranged in operative relation to said belt.

12. A machine of the character described comprising a vertically disposed endless carder belt, means for driving said belt, carder breasts fixed against movement in a direction longitudinally of the belt arranged in operative relation to said belt, and means for dispelling heat created during operation, consisting of a water jacket situated midway of the operation of said machine.

13. A machine of the character described comprising a vertically disposed endless carder belt, means for driving said belt consisting of an upper drum rigidly mounted and a lower floating drum, and carder breasts fixed against movement in a direction longitudinally of the belt arranged in operative relation to said belt.

14. In a machine of the character described, the combination of a vertically disposed endless carder belt, carder breasts arranged in cooperative relation to said belt, hingedly mounted carrier means for said breasts, means for adjustably mounting said breasts on said carrier means, supports arranged adjacent to the inner surfaces of said belt, and means for adjustably mounting said supports.

15. A seed-delinting machine comprising the combination of a vertically disposed endless movable carder belt, an upper roller over which said belt passes, a free slidably-journaled lower roller which by its weight tensions said belt, a set of stationary carder breasts positioned intermediate the downward travel and upward travel of said belt, means for accurately adjusting the distance between the belt and said breasts, means for feeding seed to said belt, means for cleaning said belt of lint, and means for varying the tension exerted by said lower roller.

16. In a seed delinting machine, the combination of a vertically-suspended movable carder belt, a journaled driven roller over which said belt passes and from which it is suspended vertically, a tensioning roller at the lower end of said belt bearing with its entire weight on said belt, means for increasing the weight and tensioning effect of said roller, stationary carder breasts positioned closely adjacent said belt intermediate of said rollers, one in the downward travel and one in the upward travel of said belt, means for feeding seed to said belt and breasts whereby the seeds will be carried in a downward direction past one set of breasts, and means for thereupon passing the seed in an upward direction past the second set of said breasts, means for discharging the seed from said machine, and means for removing the lint combed from said seed from said belt.

In witness whereof, I have hereunto subscribed my name.

WILLIAM S. SHAW.

CERTIFICATE OF CORRECTION.

Patent No. 1,882,450.                            October 11, 1932.

WILLIAM S. SHAW.

It is hereby certified that error appears in the printed specification of the above numbered patent requiring correction as follows: Page 5, line 4, claim 2, before "carder" insert the words "vertically disposed"; lines 42 and 43, claim 5, for "sectioned" read "sectional"; and line 54, claim 6, for "carded" read "carder"; and that the said Letters Patent should be read with these corrections therein that the same may conform to the record of the case in the Patent Office.

Signed and sealed this 20th day of December, A. D. 1932.

M. J. Moore,
(Seal)                                    Acting Commissioner of Patents.